(12) United States Patent  
Friedel et al.

(10) Patent No.: US 10,257,099 B2  
(45) Date of Patent: Apr. 9, 2019

(54) APPLICATIONS OF PROCESSING PACKETS WHICH CONTAIN GEOGRAPHIC LOCATION INFORMATION OF THE PACKET SENDER

(71) Applicant: A10 Networks, Incorporated, San Jose, CA (US)

(72) Inventors: Michael Friedel, Alexandria, VA (US); Hasnain Karampurwala, Santa Clara, CA (US); Gurudeep Kamat, San Jose, CA (US)

(73) Assignee: A 10 NETWORKS, INCORPORATED, San Jose, CA (US)

( * ) Notice: Subject to any disclaimer, the term of this patent is extended or adjusted under 35 U.S.C. 154(b) by 391 days.

(21) Appl. No.: 14/502,682

(22) Filed: Sep. 30, 2014

(65) Prior Publication Data

US 2016/0094433 A1   Mar. 31, 2016

(51) Int. Cl.
*H04L 12/851* (2013.01)
*H04L 12/721* (2013.01)

(52) U.S. Cl.
CPC ........ *H04L 47/2408* (2013.01); *H04L 45/566* (2013.01)

(58) Field of Classification Search
CPC .................................................. H04L 47/2408
See application file for complete search history.

(56) References Cited

U.S. PATENT DOCUMENTS

| | | | |
|---|---|---|---|
| 8,745,185 B1* | 6/2014 | Salo | H04L 63/0428 709/223 |
| 9,319,311 B2* | 4/2016 | Wang | H04L 45/306 |
| 9,762,683 B2* | 9/2017 | Karampurwala | H04L 67/18 |
| 2002/0068584 A1* | 6/2002 | Gage | H04L 29/1216 455/456.1 |
| 2002/0186661 A1* | 12/2002 | Santiago | H04L 47/10 370/252 |
| 2004/0100951 A1 | 5/2004 | O'neill | |
| 2005/0169257 A1* | 8/2005 | Lahetkangas | H04L 45/00 370/389 |
| 2005/0232277 A1 | 10/2005 | See | |
| 2007/0233368 A1* | 10/2007 | Friedmann | G03B 17/48 455/556.1 |
| 2007/0286393 A1 | 12/2007 | Roever et al. | |
| 2008/0304501 A1 | 12/2008 | Park et al. | |
| 2010/0036954 A1* | 2/2010 | Sakata | H04L 12/6418 709/226 |
| 2010/0063988 A1 | 3/2010 | Khalid et al. | |
| 2011/0247068 A1* | 10/2011 | Tolliver | H04L 41/12 726/22 |
| 2012/0036220 A1* | 2/2012 | Dare | G06F 8/61 709/217 |

(Continued)

*Primary Examiner* — Jerry B Dennison

(57) ABSTRACT

A method for routing Internet traffic is disclosed. The method comprises receiving an IPv6 packet. Further, the method comprises determining if the IPv6 packet comprises an extension header with geo-location information. Finally, responsive to a determination that the IPv6 packet comprises an extension header with geo-location information, the method comprises performing an action based on the geo-location information, wherein the action is selected from the group consisting of: authenticating the IPv6 packet, prioritizing the IPv6 packet relative to other packets, routing the IPv6 packet, and monitoring of the IPv6 packet.

16 Claims, 10 Drawing Sheets

(56) References Cited

U.S. PATENT DOCUMENTS

| | | | |
|---|---|---|---|
| 2012/0236864 A1 | 9/2012 | Zheng et al. | |
| 2013/0061292 A1* | 3/2013 | Felch | G06F 9/3851 726/4 |
| 2013/0198266 A1* | 8/2013 | Kiley | H04L 67/34 709/203 |
| 2013/0246654 A1* | 9/2013 | Cicic | H04L 45/00 709/238 |
| 2013/0305044 A1* | 11/2013 | Gutt | H04L 45/00 713/160 |
| 2013/0305357 A1* | 11/2013 | Ayyagari | H04W 12/06 726/22 |
| 2014/0119387 A1 | 5/2014 | Jiang et al. | |
| 2014/0130117 A1* | 5/2014 | Jeannot | H04L 63/08 726/1 |
| 2014/0295786 A1* | 10/2014 | Maier | H04W 4/22 455/404.2 |
| 2015/0067819 A1 | 3/2015 | Shribman et al. | |
| 2015/0134851 A1 | 5/2015 | Relan et al. | |
| 2015/0140954 A1* | 5/2015 | Maier | H04W 4/22 455/404.2 |
| 2015/0256456 A1 | 9/2015 | Previdi et al. | |
| 2015/0319681 A1 | 11/2015 | Nathanson et al. | |
| 2015/0334545 A1* | 11/2015 | Maier | H04W 4/005 455/404.2 |
| 2015/0350160 A1 | 12/2015 | Nathan et al. | |
| 2016/0007316 A1* | 1/2016 | Vaidya | H04W 64/003 370/312 |
| 2016/0044054 A1 | 2/2016 | Stiansen et al. | |
| 2016/0050131 A1* | 2/2016 | Zhang | H04L 43/0811 370/244 |
| 2016/0094433 A1* | 3/2016 | Friedel | H04L 45/566 709/240 |
| 2016/0094645 A1 | 3/2016 | Ashutosh et al. | |
| 2016/0094669 A1* | 3/2016 | Karampurwala | H04L 67/18 370/328 |
| 2016/0105530 A1 | 4/2016 | Shribman et al. | |
| 2016/0119163 A1* | 4/2016 | Fadeev | H04L 12/6418 370/328 |

* cited by examiner

| DATA PREFIX 502 | LAT DEGREES 504 | LAT MINUTES 506 | LAT SECONDS 508 | ACCURACY AND DIRECTION 510 | LONG DEGREES 512 | LONG MINUTES 514 | LONG SECONDS 516 | ACCURACY AND DIRECTION 518 |

Exemplary IPv6 Extension Header Data Field Format

FIG. 5

APPLICATIONS OF PROCESSING PACKETS WHICH CONTAIN GEOGRAPHIC LOCATION INFORMATION OF THE PACKET SENDER

CROSS-REFERENCE TO RELATED APPLICATIONS

Related Applications

The present application is related to U.S. patent application Ser. No. 14/503,000, filed Sep. 30, 2014, entitled "USE OF PACKET HEADER EXTENSION FOR GEOLOCATION/GEOTARGETING," naming Michael Friedel and Hasnain Karampurwala as inventors. That application is incorporated herein by reference in its entirety and for all purposes.

FIELD OF THE INVENTION

Embodiments according to the present invention generally relate to IPv6 networks and more particularly to providing geo-location and geo-targeting services within IPv6 networks.

BACKGROUND OF THE INVENTION

Internet Protocol version 6 (IPv6) is the latest version of the Internet Protocol (IP), the communications protocol that provides an identification and location system for computers on networks and routes traffic across the Internet. IPv6 was developed to address the long-anticipated problem of IPv4 address exhaustion. The management of IPv6 address allocation process is delegated to the Internet Assigned Numbers Authority (IANA). The main function of the IANA is the assignment of large address blocks to the regional Internet registries (RIRs), which have the delegated task of allocation to network service providers and other local registries. The RIRs assign smaller blocks to local Internet registries that distributes them to users.

One drawback to the IPv6 protocol is that it does not have any built-in geo-location services. There is no field in IPv6 headers, extensions, etc. that transmits the user's location information just as there are no fields in IPv4 that provides geo-location services. Depending on the manner in which an Internet Service Provider (ISP) decides to allocate its block of addresses, they may or may not choose to use geography as a driving force. There is nothing in a conventional IPv6 address that will intrinsically provide the geographic breakdown simply by inspecting the IP address. While the regional registries are given large blocks to allocate, these blocks may only give, at best, continent level information. This is problematic because there is no way to determine the location of a client simply by analyzing the IP address. For example, a US company could receive a large block of address from American Registry for Internet Numbers (ARIN) and then route them all over the world. As a result, an address block may designate California, but certain IP addresses associated with the block may actually be used by the company's Shanghai office.

Consequently, it is challenging for network managers and Internet Service Providers (ISPs) to configure their networks to make decisions based on the geo-location of the Internet traffic.

BRIEF SUMMARY OF THE INVENTION

Accordingly, a need exists for a method and apparatus that includes geo-location information in IP packets transmitted by a client device in an efficient and flexible manner. Further, a need exists for authenticating packets that originate from a client device based on the geographic location of the client. Additionally, a need exists for prioritizing or efficiently routing packets based on the geographic location of the client device.

In one embodiment, an extension header in an IPv6 packet is used to transmit the geo-location of the client device. In one embodiment, the geographic location transmitted in the extension header is used to authenticate the packets that originate from the sender. Further, in one embodiment, the geographic location transmitted in the extension header is used to prioritize data packets from the sender relative to packets from other sources. Finally, in one embodiment, the geographic location is used to efficiently route data packets by using the sender's location.

In one embodiment, a method for routing Internet traffic is disclosed. The method comprises receiving an IPv6 packet. Further, the method comprises determining if the IPv6 packet comprises an extension header with geo-location information. Finally, responsive to a determination that the IPv6 packet comprises an extension header with geo-location information, the method comprises performing an action based on the geo-location information, wherein the action is selected from the group consisting of: authenticating the IPv6 packet, prioritizing the IPv6 packet relative to other packets, routing the IPv6 packet, and monitoring of the IPv6 packet.

In another embodiment, a non-transitory computer-readable storage medium having stored thereon instructions that, if executed by a computer system cause the computer system to perform a method for routing Internet traffic, is presented. The method comprises receiving a packet that is IPv6 over a communication network. It also comprises determining if the packet comprises an extension header with geo-location information. Further, responsive to a determination that the packet comprises an extension header with geo-location information, the method comprises performing an action based on the geo-location information, wherein the action is selected from the group consisting of: authenticating the packet, prioritizing the packet relative to other packets, routing the packet, and monitoring of the packet.

In another embodiment, an apparatus for routing Internet traffic is disclosed. The apparatus comprises a memory and a processor on a client device communicatively coupled to the memory. The processor is configured to: (a) receive an IPv6 packet over a communication network; (b) determine if the IPv6 packet comprises an extension header with geo-location information; and (c) responsive to a determination that the packet comprises an extension header with geo-location information, the processor is configured to perform an action based on the geo-location information, wherein the action is selected from the group consisting of: authenticating the packet, prioritizing the packet relative to other packets, routing the packet, and monitoring of the packet.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 5 illustrates an exemplary format for an IPv6 extension header data with geo-location information in accordance with an embodiment of the present invention.

DETAILED DESCRIPTION OF THE INVENTION

Figure 1:
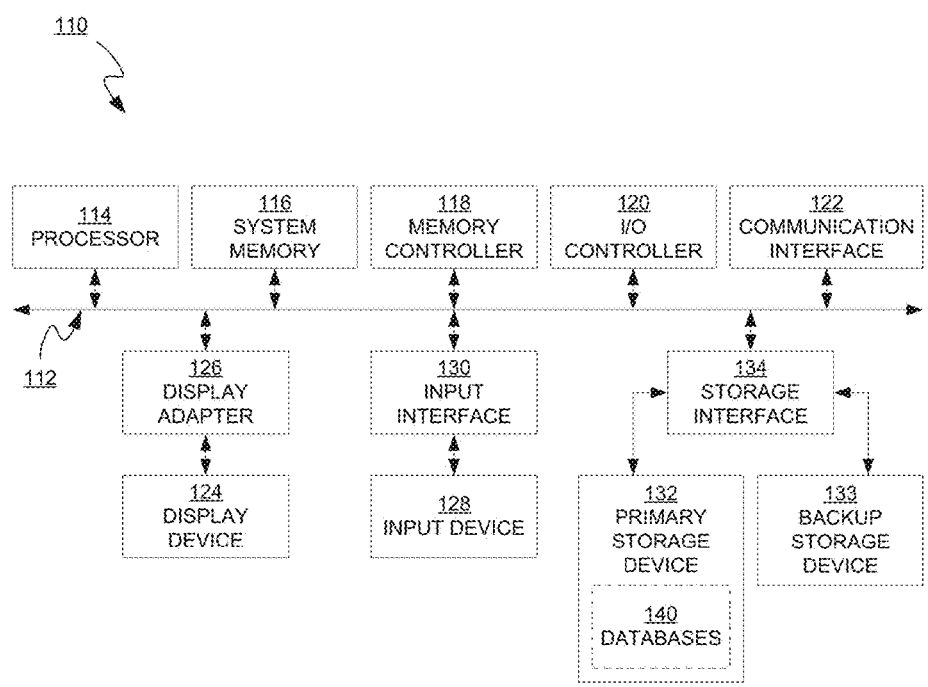
FIG. 1 is a block diagram of an example of a client-side computing system or a destination-side computing system, e.g., a server in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

NOTATION AND NOMENCLATURE

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "authenticating," "prioritizing," "routing," "constructing," "inserting," "determining," "receiving," "inserting," "transmitting," "determining," or the like, refer to actions and processes (e.g., flowchart 700 of FIG. 7) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a client-side computing system or a destination-side computing system, e.g., a server 110 in accordance with embodiments of the present invention. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 of an embodiment of the present invention and a system memory 116.

Processor 114 incorporates embodiments of the present invention and generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information.

Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
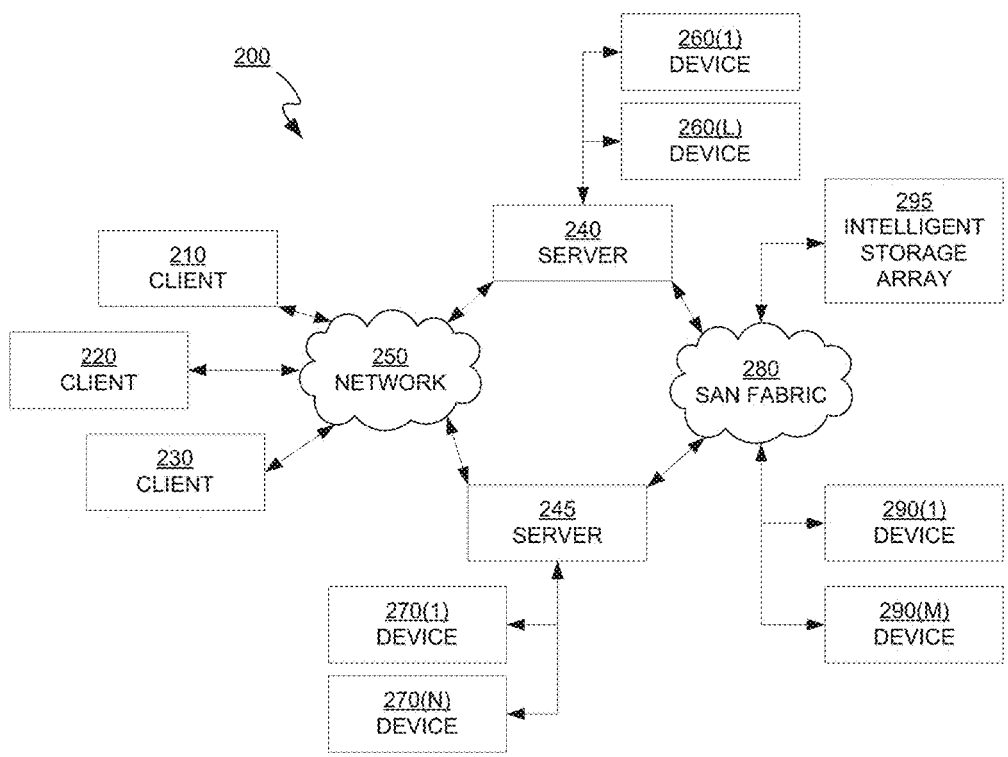
FIG. 2 is a block diagram of an example of a communication network architecture in which servers and client systems may be coupled to a network, according to embodiments of the present invention.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295.

In one embodiment, all or a portion of one or more of the example embodiments disclosed herein are encoded as a computer program and loaded onto and executed by a switch device connected between servers 240 or 245 and client systems 210, 220, and 230.

Applications of Processing Packets Which Contain Geographic Location Information of the Packet Sender In one embodiment, the present invention provides a method and apparatus that include geo-location information in IP packets transmitted by a client device in an efficient and flexible manner. Further, in one embodiment, the present invention provides a method for authenticating packets that originate from a client device based on the geographic location of the client. Additionally, in one embodiment, the present invention provides a method for prioritizing or efficiently routing packets based on the geographic location of the client device. The geo-location information inserted in an extension header of an IPv6 packet can be used by Distributed Denial of Serve (DDoS) applications, Application Delivery Controllers (ADCs), Cloud and other monitoring applications.

Figure 3:
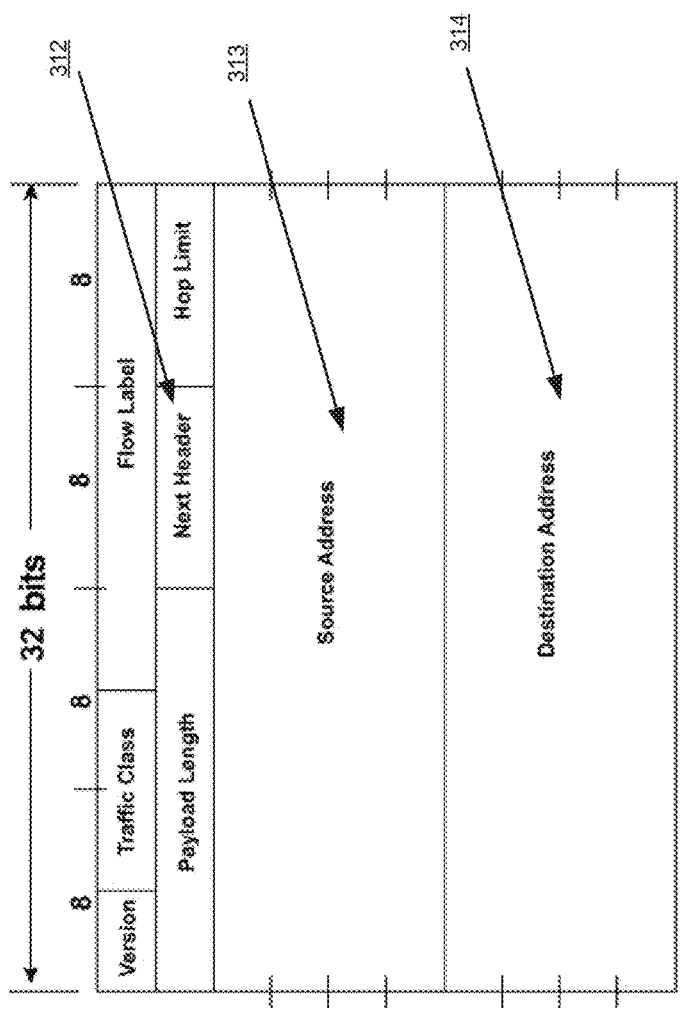
FIG. 3 is an illustration of the IPv6 header format.

In one embodiment, an extension header in an IPv6 packet is used to transmit the geo-location of the client device. FIG. 3 is an illustration of the IPv6 header format. The IPv6 header comprises a "Next Header" field 312, which is an 8-bit selector field to identify the type of header immediately following the IPv6 header. The Next Header field 312 can be used to indicate that the extension header following the main IPv6 header comprises geo-location information.

Further, the IPv6 header comprises a source address field 313 and a destination address field 314 to indicate the source and destination address of the IP packet, wherein the source IP address of the client is indicated by field 313 and the destination IP address of the server or load balancer is indicated by field 314.

Figure 4A:
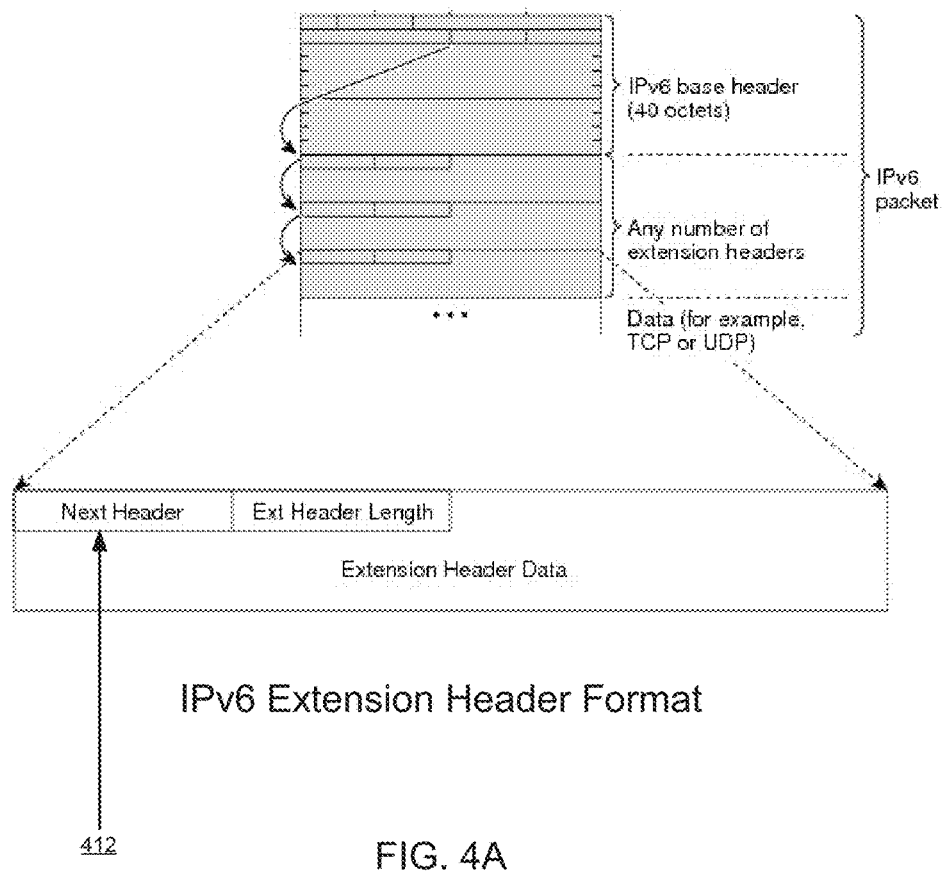
FIG. 4A illustrates the IPv6 extension header format.

FIG. 4 illustrates the IPv6 extension header format. As illustrated in FIG. 4, an IPv6 packet can have zero, one or more extension headers, each identified by the Next Header field 312 of the preceding header. In one embodiment of the present invention, one of the extension headers is used to convey the geo-location information of the sender. The Next Header field 412 in a preceding extension header (or the Next Header field 312 in the main header) is used to encode a prefix code to indicate that the next header comprises geo-location information, e.g., using "GEO" as a prefix code. The extension header code will likely need to be assigned by the Internet Assigned Numbers Authority (IANA). The "GEO" prefix code will be referred to herein as an alias to this assigned code.

In one embodiment, a type of header known as a Destination Options header may be used to encode geo-location data in an IPv6 packet. The Destination Options header typically includes options that need to be examined by the first destination that appears in the IPv6 Destination Address field plus subsequent destinations listed in the Routing header.

Figure 4B:
FIG. 4B illustrates the format of the options field of a Destination Options header.

FIG. 4B illustrates the format of the options field of a Destination Options header. The Destination Options header carries a variable number of type-length-value (TLV) encoded "options." The option type code 462 will need to be assigned by IANA, e.g., the "GEO" code could be assigned to represent that the Destination Options header contains geo-location information. As stated above, "GEO" is only one example of a code that may be assigned by the IANA to indicate the inclusion of geo-location information in a packet. The option-data field 464 may indicate the length of the GEO location information.

FIG. 5 illustrates an exemplary format for an IPv6 extension header data with geo-location information in accordance with an embodiment of the present invention. For example, in one embodiment, the header data can contain a 3 byte data prefix field 502 indicating the type of data transmitted in the data field, e.g., "GEO."

In one embodiment, the extension header can comprise a 7 byte data field for latitude and accuracy training. For example, a 2 byte field 504 can be allocated to latitudinal degrees, a 2 byte field 506 can be allocated to latitudinal minutes and a 2 byte field 508 can be allocated to latitudinal seconds. Further, a 1 byte field 510 can be allocated to accuracy and direction. In one embodiment, bit 0 of the 1 byte field 510 when set can indicate "North" whereas when un-set can indicate "South." Bits 1 to 7 of the 1 byte field 510 can, in one embodiment, for example, indicate latitudinal accuracy in increments of 10 meters, e.g., when set to 3, latitudinal accuracy would be 30 meters. Also, a zero value for bits 1 to 7 could indicate a configured or artificial value.

Similar to latitude related fields, the extension header can also comprise a 7 byte field for longitude and accuracy training. For example, a 2 byte field 512 can be allocated to longitudinal degrees, a 2 byte field 514 can be allocated to longitudinal minutes and a 2 byte field 516 can be allocated to accuracy and direction. Further, a 1 byte field 518 can be allocated to accuracy and direction. In one embodiment, bit 0 of 1 byte field 518 when set can indicate "West" whereas when un-set can indicate "East." Bits 1 to 7 of the 1 byte field 518 can, in one embodiment, indicate longitudinal accuracy in increments of 10 meters, for example. It should be noted that FIG. 5 only provides one example of the format and type of data that can be used to convey geo-location information. Many other embodiments are possible as well.

Figure 6:
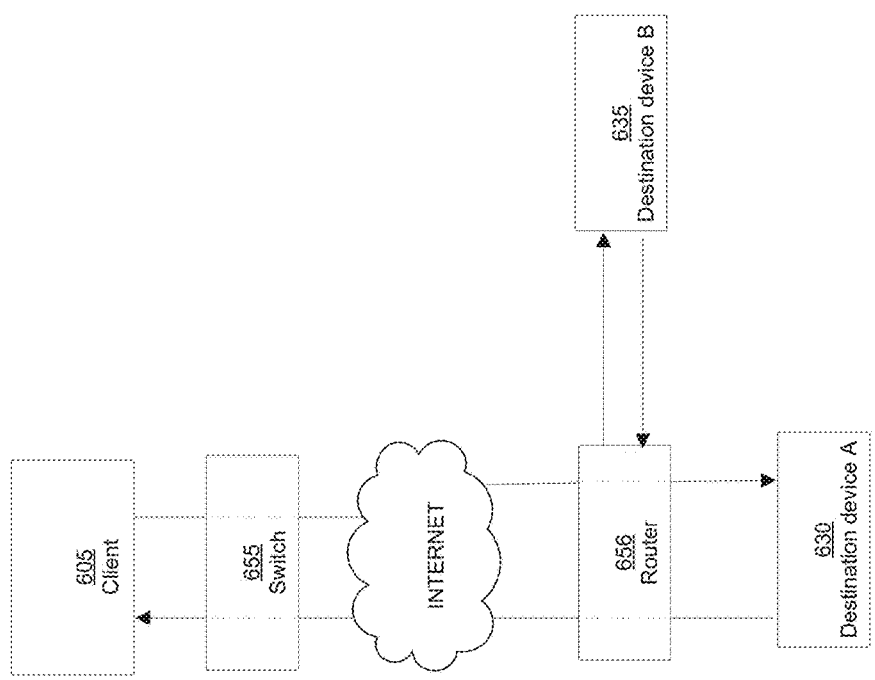
FIG. 6 illustrates an exemplary configuration of a network using extension headers in IPv6 packets to transmit geo-location information in accordance with an embodiment of the invention.

FIG. 6 illustrates an exemplary configuration of a network using extension headers in IPv6 packets to transmit geo-location information in accordance with an embodiment of the invention. When the client 605, e.g., a personal computer, a smart phone, a tablet computer, a thin client etc. transmits a request, an IPv6 extension header, in one embodiment, is inserted into the IPv6 packet by the client device 605. Alternatively, another gateway device, e.g., switch 655 through which the client's traffic passes can also be configured to insert the geo-location extension header into the IPv6 packet. In one embodiment, either device 605 or 655 can dynamically update positional data in real-time through Global Positioning System (GPS), cellular or other location-based source. For example, the client 605 could be configured to retrieve data from the built-in GPS on a smart phone device to insert into the extension header. Alternatively, the client may be configured to obtain the location data from a cellular source. In one embodiment, instead of updating dynamically, the positional data can be configured manually.

In one embodiment, the present invention provides a method for authenticating packets that originate from a client device based on geographic location of the client. For example, a device, e.g., router 656 in the path of the traffic could examine the geo-location information in the extension header and provide protection or service changes and monitoring based on the location data before the traffic reaches its intended destination device A 630 or destination device B 635.

If providing protection, the in-path device 656 can, in one embodiment, have a database of geographic boundaries for countries and several depths of sub-regions within them. Using this data, in one embodiment, device 656 could tie the packet to a given country and sub-region and block traffic, rate limit, or provide additional filtering services if configured. This feature could be used, for example, in DDOS applications wherein DDOS attacks could be prevented by blocking traffic from certain problematic geographic regions. Or, for example, traffic from certain problematic regions could be more carefully examined before allowing it to pass through.

In one use case, for example, the geo-location information sent from a client's device can also be used to block undesirable traffic, e.g., text messages sent by the driver of a car in motion This location information can be inserted directly into the IPv6 packets by the client device, e.g., a smart phone being used by the driver. Alternatively, a beacon within the vicinity, e.g., a Wi-Fi device in the car could be configured to determine the location of devices requesting access to the network and insert the location data to the outgoing packets. For example, based on signal strength the beacon could determine relative locations of the devices and determine if the traffic was coming from the driver of the car versus the passengers. Then based on the location inserted into outgoing text message header, an in-path device, e.g. a load balancer could accept or reject the incoming traffic from the device.

In one embodiment, the present invention provides a method for prioritizing data packets from a certain location over other types of data packets. For example, data packets originating from a corporate source could receive higher priority over others. Or, for example, traffic for one department within the company, e.g. engineering could be prioritized over traffic from a different group within the company, e.g., human resources.

By way of further example, if the location of a client indicates that the user is on stage, e.g., during a concert or presentation, versus a member of the audience, the traffic to the on-stage user could be prioritized versus the rest of the audience. Similar to the car use case explained above, the location information can be inserted directly into the IPv6 packets by the client device, e.g., a smart phone itself. Alternatively, a beacon within the vicinity, e.g., a Wi-Fi router could be configured to determine the location of devices requesting access to the network and insert the location data accordingly into the outgoing packets. The beacon could determine relative locations, for example, by using signal strength.

If providing service changes, in one embodiment, the in-path device 656 could have the same database of geographic boundaries, as described above, but could use them for directing the packet to a cloud service, server, or other device closest to the geo-location data provided in the extension header. For example, device 656 could determine that destination device B 635, e.g., load balancer is closer to the location of client 605 and, therefore, device 656 could prioritize sending traffic from client 605 to destination device B 635 over destination device A 630.

In one embodiment, the present invention provides a method for efficiently routing packets based on the geographic location of the client. This embodiment can, for example, be used in Application Delivery Controllers (ADCs). An ADC is a computer network device in a datacenter, often part of an application delivery network (ADN) that helps perform common tasks such as those done by web sites to remove load from the web servers themselves. Many also provide load balancing. A load balancing device, for example, located in New York, for example, can route packets incoming from California to a different load balancer in California instead of processing it. Or for example, if a client device in California requests a web page of a company with servers in California, the request would be routed to a server in California that is in close proximity.

If providing monitoring services, an in-path device, e.g., device 656 could use the geographic database discussed above to provide location and accuracy trending and tracking data. For example, if device 656 is being used for protection services, feedback regarding the number of requests blocked or limited may be collected and sent to a network administrator. Or, for example, if device 656 is providing service changes, feedback regarding the re-directed traffic could also be transmitted to a network administrator.

It should be noted that there may be several conceivable applications of the geo-location information inserted into the IPv6 packets in addition to using the geo-location information to authenticate packets, prioritize packets and route packets.

Figure 7:
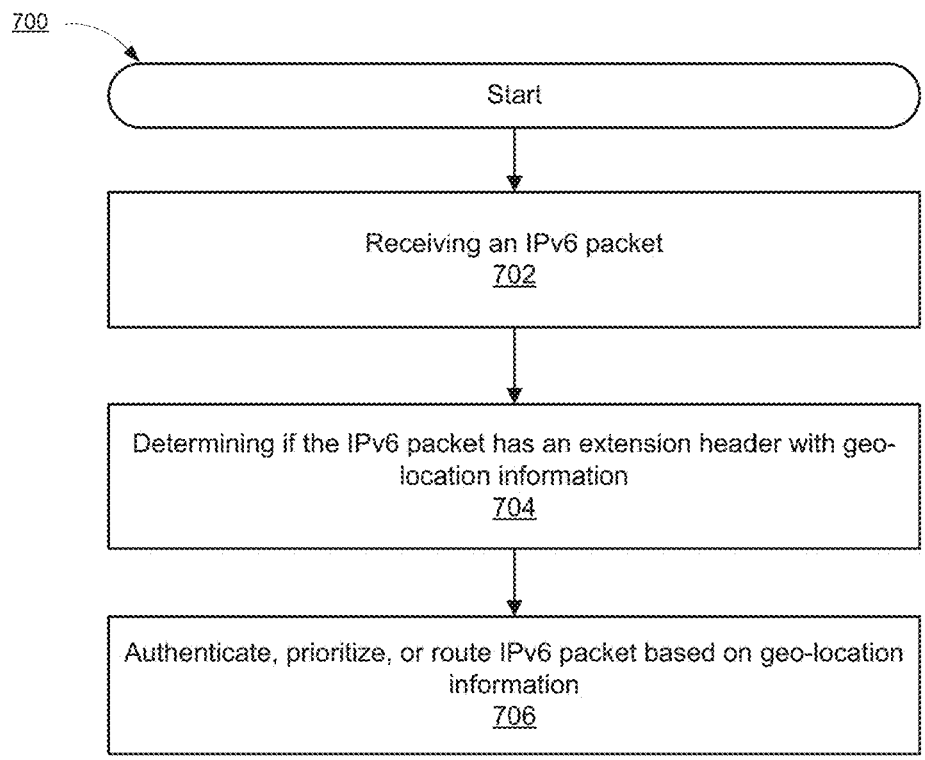
FIG. 7 depicts a flowchart for an exemplary computer controlled process for managing Internet traffic based on geo-location information in an IPv6 packet in accordance with embodiments of the present invention.

FIG. 7 depicts a flowchart for an exemplary computer controlled process for managing Internet traffic based on geo-location information in an IPv6 packet in accordance with embodiments of the present invention.

At step 702, an IPv6 packet is received by a device in the path of the traffic between a client 605 and a destination device, e.g., device 630 or 635 in FIG. 6, or by the destination device itself.

At step 704, the receiving device determines if the IPv6 packet has an extension header with geo-location information.

Finally, at step 706, the receiving device makes a decision based on the geo-location information. The decision can, among other things, be related to authenticating, prioritizing or routing the IPv6 packet.

Figure 8:
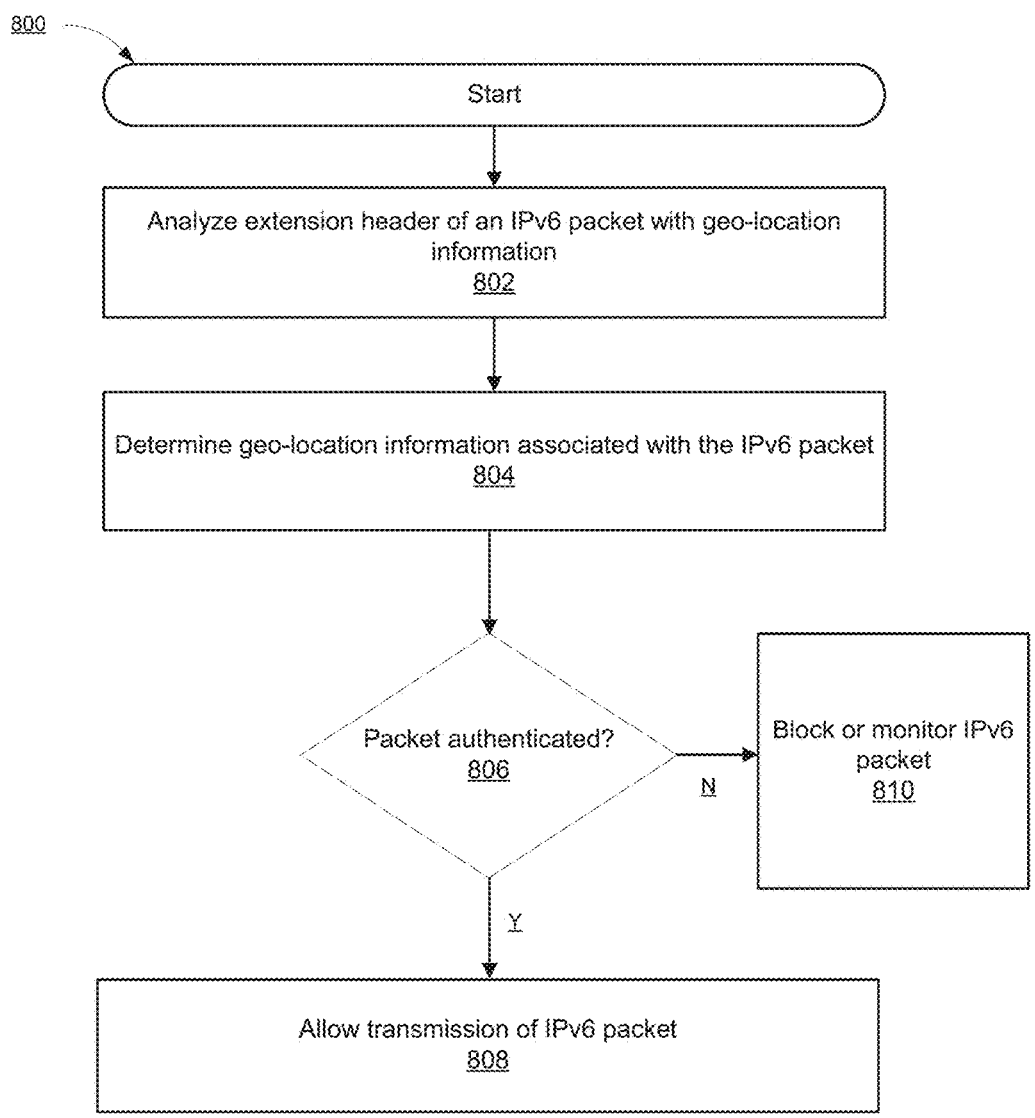
FIG. 8 depicts a flowchart for an exemplary computer controlled process for authenticating an IPv6 packet based on geo-location information in the packet in accordance with embodiments of the present invention.

FIG. 8 depicts a flowchart for an exemplary computer controlled process for authenticating an IPv6 packet based on geo-location information in the packet in accordance with embodiments of the present invention.

At step 802, the receiving device analyzes the extension header of the IPv6 packet containing geo-location information.

At step 804, the receiving device, determines the geo-location information. As explained above, the geo-location information can, among other things, include latitudinal, longitudinal, and direction information.

At step 806, the receiving device determines if the packet is authenticated based on the geo-location information. If the packet is determined to originate from a trusted source, at step 808 it is authenticated and allowed to transmit. If, however, it is determined to originate from an untrustworthy source, at step 810, the packet is either blocked or flagged for further monitoring.

Figure 9:
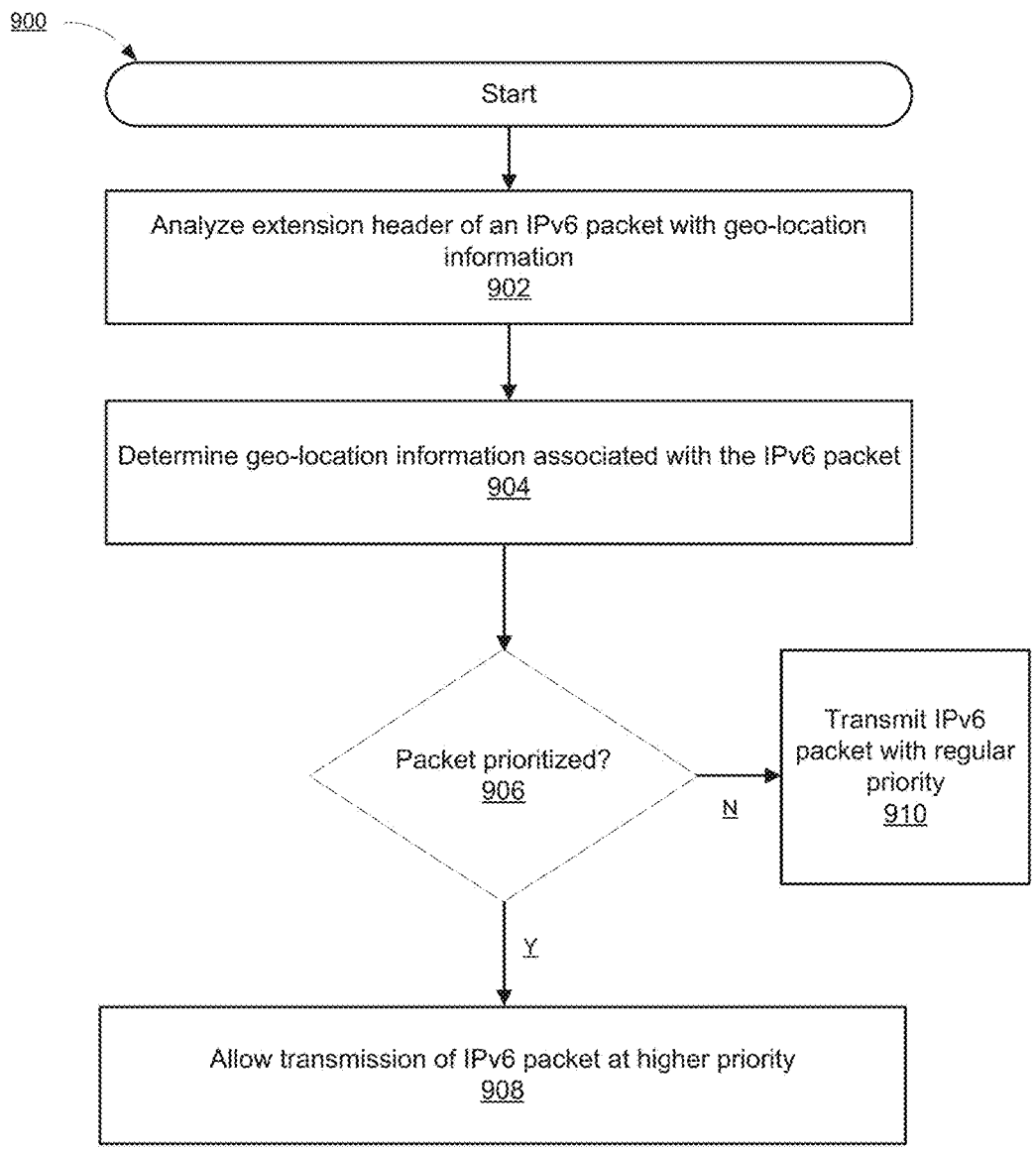
FIG. 9 depicts a flowchart for an exemplary computer controlled process for prioritizing an IPv6 packet based on geo-location information in the packet in accordance with embodiments of the present invention.

FIG. 9 depicts a flowchart for an exemplary computer controlled process for prioritizing an IPv6 packet based on geo-location information in the packet in accordance with embodiments of the present invention.

At step 902, the receiving device analyzes the extension header of the IPv6 packet containing geo-location information.

At step 904, the receiving device, determines the geo-location information. As explained above, the geo-location information can, among other things, include latitudinal, longitudinal, and direction information.

At step 906, the receiving device determines if the packet is to be prioritized based on the geo-location information. As explained above, this determination can be based on relative origin of the IPv6 packet as compared with the location of origin of other IPv6 packets, e.g., prioritizing traffic originating from presenter on stage v/s from a member of the audience. If the packet is determined to need higher priority, at step 908 it is prioritized and allowed to transmit at a higher priority. If, however, it is determined to not require high priority, at step 910, the packet is routed at regular priority.

Figure 10:
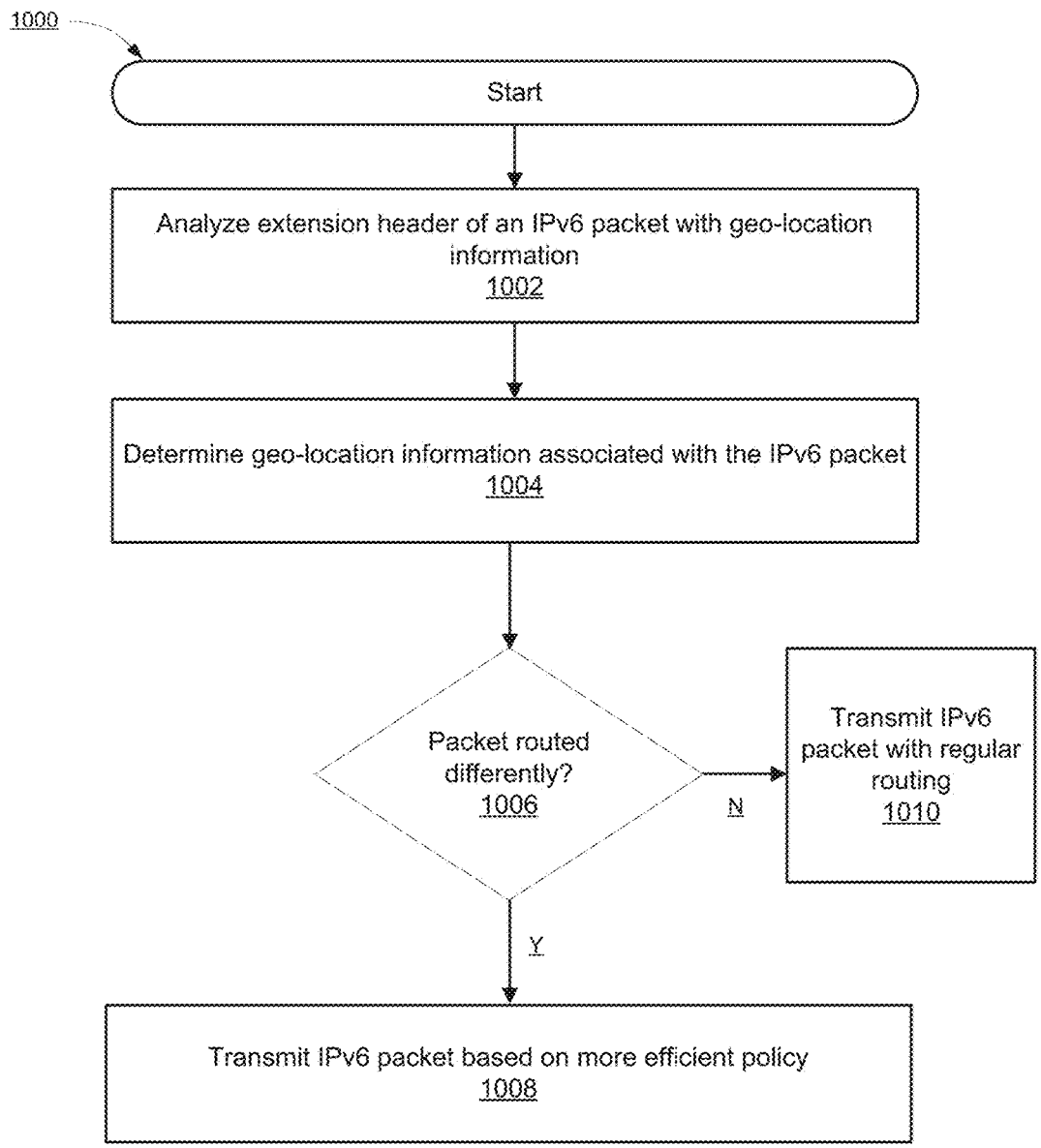
FIG. 10 depicts a flowchart for an exemplary computer controlled process for efficiently routing an IPv6 packet based on geo-location information in the packet in accordance with embodiments of the present invention.

FIG. 10 depicts a flowchart for an exemplary computer controlled process for efficiently routing an IPv6 packet based on geo-location information in the packet in accordance with embodiments of the present invention.

At step 1002, the receiving device analyzes the extension header of the IPv6 packet containing geo-location information.

At step 1004, the receiving device, determines the geo-location information. As explained above, the geo-location information can, among other things, include latitudinal, longitudinal, and direction information.

At step 1006, the receiving device determines if the packet is to be routed differently relative to other packets based on the geo-location information, e.g., packets originating from a given location may be re-routed to servers or load balancers closer to the destination location. If the packet is determined to need special routing, at step 1008 it is routed differently based on a pre-determined policy. If, however, it is determined to require regular routing, at step 1010, the packet is transmitted regularly without any re-routing.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for routing Internet traffic, said method comprising:
   receiving an IPv6 packet;
   determining if said IPv6 packet comprises an extension header with geolocation information, wherein the extension header with geolocation information is inserted into the IPv6 packet by a client device; and
   responsive to a determination that said IPv6 packet comprises an extension header with geo-location information, performing an action based on said geolocation information, wherein said action comprises monitoring of said IPv6 packet, wherein said monitoring comprises tracking said IPv6 packet and providing feedback to a network administrator regarding a path of said IPv6 packet through a network, and wherein said action further comprises prioritizing said IPv6 packet, wherein said prioritizing comprises prioritizing delivery of said IPv6 packet based on a geographic location of the client device relative to other IPv6 packets originating from different locations.

2. The method of claim 1, further comprising:
   receiving a second IPv6 packet;
   responsive to a determination that said second IPv6 packet does not comprise an extension header with geo-location information, handling said second IPv6 packet without any re-routing.

3. The method of claim 1, wherein said receiving and said determining are performed by a device in the path of a router and a destination device.

4. The method of claim 3, wherein said device is selected from a group consisting of: a router, a load balancer or a switch.

5. The method of claim 1, wherein said action further comprises authenticating said IPv6 packet, wherein said authenticating comprises:
   blocking said IPv6 packet based on its geographic location of origin.

6. The method of claim 1, wherein said action further comprises routing said IPv6 packet, wherein said routing comprises:
   routing said IPv6 packet to a destination device closest in proximity to said geo-location information indicated in said extension header of said IPv6 packet.

7. A non-transitory computer-readable storage medium having stored thereon instructions that, if executed by a computer system cause the computer system to perform a method for routing Internet traffic, said method comprising:
   receiving a packet that is IPv6 over a communication network;
   determining if said packet comprises an extension header with geo-location information, wherein the extension header with geolocation information is inserted into the IPv6 packet by a client device: and
   responsive to a determination that said packet comprises an extension header with geo-location information, performing an action based on said geo-location information, wherein said action comprises monitoring of said IPv6 packet, wherein said monitoring comprises tracking said IPv6 packet and providing feedback to a network administrator regarding a path of said IPv6 packet through a network, and wherein said action further comprises prioritizing said IPv6 packet, wherein said prioritizing comprises prioritizing delivery of said IPv6 packet based on a geographic location of the client device relative to other IPv6 packets originating from different locations.

8. The computer-readable medium as described in claim 7, wherein said method further comprises:
   receiving a second packet that is IPv6 over said communication network; and responsive to a determination that said second packet does not comprise an extension header with geo-location information, handling said second IPv6 packet without any re-routing.

9. The computer-readable medium as described in claim 7, wherein said receiving and said determining are performed by a device in the path of a router and a destination device.

10. The computer-readable medium as described in claim 9, wherein said device is selected from a group consisting of: a router, a load balancer or a switch.

11. The computer-readable medium as described in claim 7, wherein said action further comprises authenticating said IPv6 packet, wherein said authenticating comprises:
    blocking said packet based on its geographic location of origin.

12. The computer-readable medium as described in claim 7, wherein said action further comprises routing said IPv6 packet, wherein said routing comprises:
    routing said packet to a destination device closest in proximity to said geolocation information indicated in said extension header of said packet.

13. An apparatus for routing Internet traffic, said apparatus comprising:
    a memory;
    a processor on a client device communicatively coupled to said memory, wherein said processor is configured to:
      receive a IPv6 packet over a communication network;
      determine if said IPv6 packet comprises an extension header with geolocation information, wherein the extension header with geolocation information is inserted into the IPv6 packet by a client device; and
      responsive to a determination that said packet comprises an extension header with geo-location information, perform an action based on said geo-location information, wherein said action comprises monitoring of said IPv6 packet, wherein said monitoring comprises tracking said IPv6 packet and providing feedback to a network administrator regarding a path of said IPv6 packet through a network, and wherein said action further comprises prioritizing said IPv6 packet, wherein said prioritizing comprises prioritizing delivery of said IPv6 packet based on a geographic location of the client device relative to other IPv6 packets originating from different locations.

14. The apparatus of claim 13, wherein said processor is further configured to:
    receive a second IPv6 packet over said communication network; and responsive to a determination that said second packet does not comprise an extension header with geo-location information, said processor is further configured to handle treat said second packet without any re-routing.

15. The apparatus of claim 13, wherein said action further comprises authenticating said IPv6 packet, wherein said authenticating comprises:
    blocking said packet based on its geographic location of origin.

16. The apparatus of claim 13, wherein said action further comprises routing said IPv6 packet, wherein said routing comprises:
routing said packet to a destination device closest in proximity to said geolocation information indicated in said extension header of said packet.

\* \* \* \* \*